United States Patent [19]

Bollina et al.

[11] 4,289,276
[45] Sep. 15, 1981

[54] IMPROVED APPARATUS FOR CLEANING VEHICLES

[75] Inventors: Ezio Bollina, Bologna; Rubens Basaglia, Galliera, both of Italy

[73] Assignee: B & B Bologna di Basaglia Rubens e Bollina Ezio S N C, Bologna, Italy

[21] Appl. No.: 87,070

[22] Filed: Oct. 22, 1979

[30] Foreign Application Priority Data

Nov. 3, 1978 [IT] Italy ................................. 3583 A/78

[51] Int. Cl.³ .............................................. B08B 3/08
[52] U.S. Cl. .................................. 239/305; 239/307; 239/311; 239/312
[58] Field of Search ............................. 239/302–305, 239/307, 308, 310–312

[56] References Cited

U.S. PATENT DOCUMENTS

| | | | |
|---|---|---|---|
| 1,502,115 | 7/1924 | Nicholson | 239/311 X |
| 2,345,614 | 4/1944 | Malsbary et al. | 239/307 X |
| 3,623,669 | 11/1971 | Woods | 239/307 |
| 3,797,744 | 3/1974 | Smith | 239/305 X |

Primary Examiner—Andres Kashnikow
Attorney, Agent, or Firm—Cushman, Darby & Cushman

[57] ABSTRACT

Improved apparatus for cleaning vehicles includes three water lines each having a pump and a pressure regulator therein. A liquid container is connected to each line upstream of the pump, for adding liquid to the line, by a dosage metering device and a shut-off valve. Two containers are for liquid cleaners, acid and alkaline, respectively, while the third container is for water-repellant rinsing liquid. The two cleaner lines are alternatively connectable downstream of the pumps therein to a compressed air spray nozzle, while the rinsing liquid line is connectable to a separate rinsing nozzle that is also usable for drying by connection to the compressed air source.

1 Claim, 3 Drawing Figures

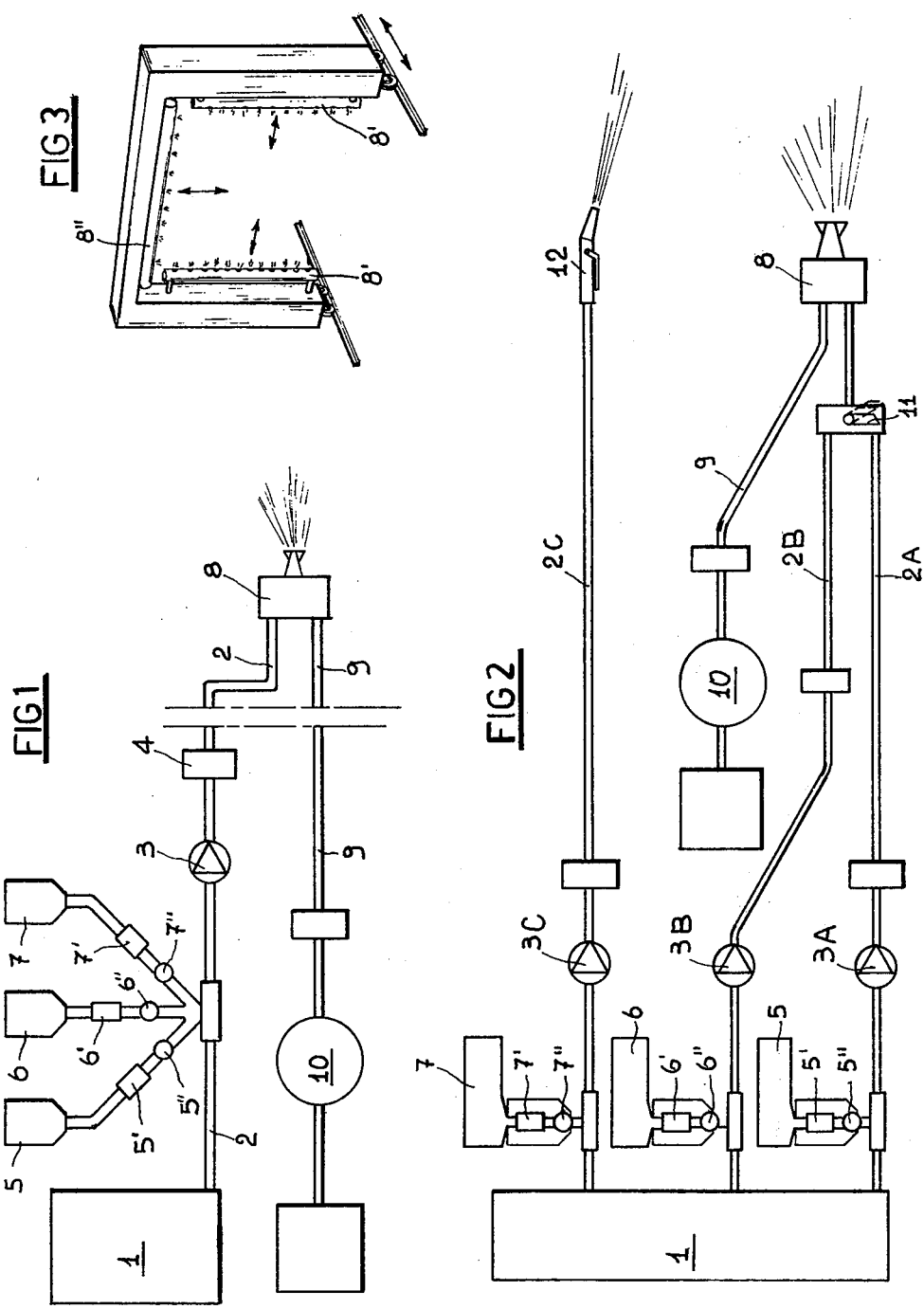

IMPROVED APPARATUS FOR CLEANING VEHICLES

BACKGROUND OF THE INVENTION

The subject of the invention is a process for washing vehicles or mechanical parts thereof, as well as the apparatus utilized for carrying out the said process.

DESCRIPTION OF THE PRIOR ART

The washing of vehicles, particularly motor vehicles, given as an example herein because of the simplicity of the description and because it is the one with which the invention in question is most directly concerned, is performed, both for the individual manual washing of vehicles and for the washing of vehicles on what are known as "automatic washing plants", through the dual chemical action of the detergents and soaps used, and through the mechanical action of sponges, brushes or similar, and equivalent washing means that come into contact with the external surface of the motor vehicle.

Leaving aside the simple case of manual washing since there are obvious large scale application difficulties, the problem arises with automatic washing plants, of the presence of the brush or brushes which, as stated above, constitute an integral part of the system and, altthough on one hand, exercise a mechanical action on the coachwork for the removal therefrom of dirt, on the other, become in a short space of time soaked in dust and in abrasive material which causes obvious damage to the coachwork, such as scoring, unless very frequent steps are taken to clean or replace the said brush.

With the aforementioned apparatus there is, above all, a considerable consumption of water combined with the fact that not all the parts (the edges onto which the doors close, and parts that are partly hidden and are not easily accessible, such as the back of the fenders, etcetera) succeed in being reached by the cleansing action.

Although attempts have been made to partially overcome this by, for example, increasing the pressure of the water and/or raising the temperature thereof in order to intensify, insofar as the former is concerned, the mechanical action of the water through the use of highly directional jets, the results, to tell the truth, have scarcely been very praiseworthy, and this is also because the possibility exists in this case, in view of the strength of the jet, of water seeping into the interior of the vehicle (or into parts where it should not), especially if the gaskets do not provide a proper seal, while insofar as the latter is concerned, a rise in temperature brings about an increase in the efficiency of the chemical action of the product, though this inevitably results in particularly high operating costs.

SUMMARY OF THE INVENTION

The essential object of the invention is to do away with the difficulties outlined above through a process with which it is possible to wash vehicles, or parts thereof, using an exclusively chemical action which thus does not employ auxiliary mechanical means, and for this reason is able not to damage the delicate parts of the vehicle superficially and with which, furthermore, any part that may be partially or directly hidden can, from a cleansing effect viewpoint, be reached.

A further object of the invention is the provision of an apparatus that utilizes the above mentioned process through constructional methods that are particularly simple and, because of their simplicity, are extremely cheap both as regards plant costs and running costs, the latter certainly being less than on the present automatic washing plants.

These and other objects too are all attained with the process forming the subject of the invention, essential features of which are that the washing of the vehicle or of the parts is effected in the following stages:

(a) a mixture containing a first finely nebulized acid base product is sprayed;

(b) a mixture containing a second finely nebulized alkaline base product is sprayed;

(c) a mixture containing a third water repellent product is sprayed.

The process in question is carried out using an apparatus that is characterized by the fact that it comprises: a tank to hold the solvent liquid; a group constituted by three containers, one for each product and each provided, in series, with a doser and on-off means for the product flowing into the duct that connects with the said tank; at least one pressurizing system positioned along the said duct, downstream with respect to the point where the said products converge; a pressure regulator device, placed after the said pressurizing system; and at least one nozzle for nebulizing the solvent-product mixture, the said nozzle being connected, moreover, for the aforementioned nebulization, to a compressed air production plant.

In one preferred form of embodiment, the apparatus in question is characterized by the fact that it comprises a pressurizing system for each product, placed downstream with respect to the relevant container group/doser/on-off means, the delivery of which for the first and second product converges, through a flow deviation device, at the said nozzle, while the pressurizing system delivery for the third product is connected, in an independent fashion, to a device for spraying the solvent-third product mixture.

BRIEF DESCRIPTION OF THE DRAWINGS

Further characteristics and advantages of the invention will emerge more clearly from the detailed description that follows of one preferred form of embodiment, illustrated purely as an unlimited example on the accompanying drawings, in which:

FIG. 1 shows, in diagrammatic example, a first solution for the apparatus according to the invention;

FIG. 2 shows, again diagrammatically, the preferred form of embodiment for the apparatus in question;

FIG. 3 shows, also in diagrammatic form, a further solution example for the spraying part of the apparatus according to the preceding figure.

DESCRIPTION OF THE PREFERRED EMBODIMENT

With reference to the accompanying figures, at 1 there is a tank in which the solvent (in this particular case water) is held and this is connected, via a duct 2, to a pressurizing system which, in the case under consideration, is constituted by a pump 3 and by a pressure regulating device 4 placed in series one behind the other. At 5, 6 and 7 there are three containers for the first liquid A, for the second liquid B and for the third liquid C, respectively, which have to be mixed in the most suitable proportions with the water coming from the tank 1. At 5', 6' and 7' there are corresponding liquid quantity dosers. Finally, at 5", 6" and 7" there are on-off valves downstream of which the confluence occurs of the pipes for the three products A, B and C with the duct 2 coming from the tank 1.

Downstream with respect to the pressure regulating device 4, the duct 2 converges with a nozzle 8 (naturally, depending on the exigencies and the capacity of the plant there can be more than one nozzle) which is contemporaneously supplied by a second infeed duct 9 with compressed air provided, for example, by a common compressor 10. The compressed air is of fundamental importance for obtaining the highest possible degree of nebulization and atomization of the water-product mixture to be sprayed on the vehicle being washed.

The products A, B and C are constituted by: an acid base product which, when sprayed finely (as stated the mixture is nebulized to perfection) onto the parts of the vehicle, decomposes the silicates and eliminates dust, sand, earth and calcareous deposits in general; an alkaline base product which dissolves grease in general; and a water repellent product for rinsing, which, by increasing the surface tension of the water, causes it to form into large drops which, by gravity, drop and, on one hand, carry with them all the dirt accumulated by the preceding products, and on the other, contribute in the subsequent drying stage in the way that will be seen below.

It has also been seen that insofar as the third product is concerned, the nebulization of the mixture in which it is contained is not necessary since being water repellent, the said product is distributed in the solvent in an adequate way to guarantee satisfactory efficiency at the time of use. Furthermore, with the preceding solution, the utilization of the nozzle led to an unnecessary consumption of air in addition to the fact that, because of the need for large quantities of water, fairly long times resulted during the rinsing stage. In this connection FIG. 2 illustrates a preferred form of embodiment for the apparatus according to FIG. 1, wherein, for each product, an identical number of pumps, 3A, 3B and 3C, respectively, were employed, the delivery of the first two of these being provided with a pair of pipes 2A and 2B (corresponding to the first and to the second product, respectively) ending at the nozzle 8, via a flow deviation device 11, while the third pipe 2C, independently of the others, terminates at a gun 12 for the spraying of the third product mixture without the aid of compressed air.

The same concept is also applied to the example given in FIG. 3, wherein a typical portal is shown for an automatic washing apparatus and at 8' there are a number of nozzles from which the products A and B exit alternately, and at 8" the nozzles and the gun or jet from which the third product is expelled.

The possibility also exists to build a tunnel apparatus provided with a number of portals, each utilized for one single product, which are stationary, and underneath which the vehicles are made to slide.

The method wherein the pipes are numbered 2A and 2B is important in order not to have the products mixed undesirably (the union of which would counteract the effect) or excessive product losses. Furthermore, the gun can, once the rinsing stage is over, be connected to the compressed air pipe for the drying of the vehicle, since a source of air is available.

Again, insofar as a portal is concerned, the rinsing and drying nozzles can be separate so as to dispense with the down time between one stage and another needed to evacuate the pipes.

As regards the apparatus illustrated in FIG. 2, the doubling of the sprayers makes it possible, furthermore, to contemporaneously wash a number of vehicles with the aid of at least two operators to look after the cleaning nozzles 8 and the rinsing (drying) gun 12, respectively, and to thus reduce the handling times for each individual vehicle.

With the process and the apparatus described above, it is possible, therefore, to wash vehicles or mechanical parts thereof solely and exclusively through a chemical action on the part of the products utilized which act individually, particularly the first two, on the dirt and attack it, thanks to the fineness of the nebulization of the mixture which carries the product onto each and every part of the coachwork, even where partially hidden, without it penetrating where it is not wanted, with the mixture being expelled at a low pressure which thus allows the product to remain longer on the surface; and this is the contrary of what happened previously where although, on one hand, the use of jets with high pressure permitted a greater mechanical action on the part of the mixture, on the other, it cut down the time the mixture remained on the surfaces to just a few seconds, since the violently sprayed mixture rebounded, almost instantaneously, onto the ground and went to waste without its chemical characteristics having been in the least exploited.

Above all, and on account of the foregoing, with the apparatus in question although mixtures that are greater percentge-wise are used, the consumption both of the product and of water is less.

What is claimed is:

1. The vehicle cleaning apparatus comprising:
    three flow lines, each connected to a source of water;
    three containers, a first for an alkaline liquid cleaner, a second for an acid liquid cleaner, and a third for a water-repellent rinsing liquid;
    means connecting each of said containers to a respecive flow line for adding the corresponding liquid to the said line, each of said connecting means including proportionate metering dosage means and a shut-off valve;
    pump means in each of said lines downstream of the point of connection of the corresponding container therewith;
    pressure regulator means in each of said lines downstream of the corresponding pump means;
    a compressed air spray nozzle;
    valve means for selectively alternatively connecting said nozzle to said lines containing a mixture of water and liquid cleaner;
    means including a compressor for supplying compressed air to said nozzle to finely atomize the mixture of liquid cleaner and water issuing therefrom; and
    a nozzle detachably connectable to the line containing a mixture of water and the rinsing liquid for rinsing a vehicle subsequent to cleaning by successive applications of the two liquid cleaning mixtures by the spray nozzle and also detachably connectable to said compressed air supply for drying the vehicle subsequent to rinsing.

* * * * *